US012730304B2

(12) United States Patent
Werdehausen et al.

(10) Patent No.: US 12,730,304 B2
(45) Date of Patent: Sep. 8, 2026

(54) INFINITY-CORRECTED MICROSCOPE OBJECTIVE FOR SCANNING APPLICATIONS

(71) Applicant: Carl Zeiss Microscopy GmbH, Jena (DE)

(72) Inventors: Daniel Werdehausen, Oberkochen (DE); Yueqian Zhang, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 232 days.

(21) Appl. No.: 18/758,163

(22) Filed: Jun. 28, 2024

(65) Prior Publication Data

US 2025/0013039 A1 Jan. 9, 2025

(30) Foreign Application Priority Data

Jul. 4, 2023 (DE) ..................... 10 2023 206 338.7

(51) Int. Cl.

*G02B 27/00* (2006.01)
*G02B 9/64* (2006.01)
*G02B 21/00* (2006.01)
*G02B 21/02* (2006.01)

(52) U.S. Cl.

CPC ........... *G02B 27/0031* (2013.01); *G02B 9/64* (2013.01); *G02B 21/008* (2013.01); *G02B 21/02* (2013.01)

(58) Field of Classification Search

None

See application file for complete search history.

(56) References Cited

U.S. PATENT DOCUMENTS

| | | | | |
|---|---|---|---|---|
| 5,978,147 A * | 11/1999 | Kudo | G02B 21/33 | 359/656 |
| 8,350,904 B2 | 1/2013 | Fujimoto et al. | | |
| 8,988,780 B2 | 3/2015 | Matthae et al. | | |
| 9,746,658 B2 | 8/2017 | Abe | | |
| 9,939,622 B2 | 4/2018 | Abe | | |
| 2010/0172034 A1* | 7/2010 | Yoshida | G02B 9/64 | 359/791 |
| 2016/0116724 A1* | 4/2016 | Abe | G02B 21/33 | 359/656 |
| 2019/0324246 A1 | 10/2019 | Abe | | |
| 2021/0011268 A1* | 1/2021 | Schulz | G02B 21/02 | |
| 2021/0072522 A1 | 3/2021 | Byler | | |
| 2025/0013027 A1* | 1/2025 | Werdehausen | G02B 21/02 | |

FOREIGN PATENT DOCUMENTS

| | | |
|---|---|---|
| DE | 2011075982 A | 4/2011 |
| DE | 10 2011 109 783 A1 | 2/2013 |
| DE | 10 2017 218 169 B3 | 3/2019 |

OTHER PUBLICATIONS

German Search Report, with translation thereof, for corresponding DE 10 2023 206 338.7, dated Mar. 7, 2024.

* cited by examiner

*Primary Examiner* — Jyotsna V Dabbi
(74) *Attorney, Agent, or Firm* — Fish & Richardson P.C.

(57) ABSTRACT

An infinity-corrected microscope objective for scanning applications has a relatively small number of lenses that are dependent on the etendue such that the objective has: i) a first etendue in the range of 0.8 $mm^2$ to 1.8 $mm^2$ and a maximum of nine lenses; or ii) a second etendue in the range of more than 1.8 $mm^2$ and not more than 15 lenses.

20 Claims, 8 Drawing Sheets

INFINITY-CORRECTED MICROSCOPE OBJECTIVE FOR SCANNING APPLICATIONS

CROSS-REFERENCE TO RELATED APPLICATION

The present application claims benefit under 35 USC 119 of German patent application DE 10 2023 206 338.7, filed Jul. 4, 2023. The entire disclosure of this application is incorporated by reference herein.

FIELD

The disclosure relates to an infinity-corrected microscope objective for scanning applications. The disclosure also relates to an optical assembly and to a microscope with such an objective. The disclosure further relates to the use of a corresponding objective and to a method for automated scanning of a sample.

BACKGROUND

Depending on the field of application, it is desirable for a given microscope objective to satisfy various properties.

Microscope objectives with a high etendue are known.

US 2019-0324246, U.S. Pat. Nos. 9,746,658 and 8,350,904 relate to dry objectives with a high etendue. U.S. Pat. Nos. 9,939,622, 8,988,780, JP 2011075982 and DE 102011109783 relate to immersion objectives with a high etendue.

Such objectives can be relatively complex, and/or the image quality can drop sharply toward the periphery.

SUMMARY

The disclosure seeks to improve a microscope objective. The disclosure seeks to provide an infinity-corrected microscope objective with a simplified setup and improved optical properties.

According to a first aspect, the objective can have an etendue in the range of 0.8 $mm^2$ to 1.8 $mm^2$ and a maximum of 9 lenses. It can also have an etendue in the range of more than 1.8 $mm^2$ and a maximum of 15 lenses. In this case, the etendue may be for example less than 5.1 $mm^2$.

For example, the objectives may have vignetting of less than 5%.

They can be apochromatically corrected over a spectral bandwidth of at least 200 nm, for example in the range of 400 nm to 800 nm. They can for example be apochromatically corrected over a spectral bandwidth of at least 200 nm, for example in the range of 400 nm to 700 nm. They can for example be apochromatically corrected in the range of 460 nm to 660 nm.

They can have a numerical aperture of at least 0.9.

The objectives according to the disclosure can be manufactured cost-effectively. Nevertheless, they can result in a high robustness of the optical system.

According to an aspect, the objectives according to the disclosure can have a Strehl ratio of at least 0.8, such as at least 0.9, despite their reduced complexity.

For example, they can have such a high Strehl ratio over at least 50%, for example at least 70%, for example at least 90%, for example at least 95% of the field of view, for example over the entire field of view.

For example, they can have such a high Strehl ratio over a partial region of the field of view with an area of at least 1 $mm^2$.

This can help ensure a relatively high resolution over large regions of the field of view, such as over the entire field of view. This can help make it easier to assemble a plurality of partially overlapping images into a mosaic image.

The field of view is also referred to as the object field.

According to the disclosure, it has been recognized that, for example for scanning applications in which large, for example large-area, samples are examined, it is desirable for the microscope objectives to have a relatively large field of view and at the same time provide a relatively high resolution over the entire field of view. The Strehl ratio can be used to characterize the resolution. The Strehl ratio may be at least 0.8, for example at least 0.83, for example at least 0.89, for example at least 0.9, for the objectives according to the disclosure, for example over the entire field of view.

For example, for scanning applications it may be desirable to take a large number of images and then assemble them into a mosaic image. This can be done automatically.

For a high throughput, the total time used to take the individual images is a factor. This time generally depends firstly on the recording time for an individual image and secondly on the number of images to be taken. It is generally desirable to reduce the total time used to take the individual images. This can lead to faster results and to an increased throughput. In general, this can lead to lower costs.

A factor that can affect the total time used to record the individual images is—in addition to the recording time for an individual image—the field-of-view size of the optical system. A larger field-of-view size generally allows larger regions to be recorded in individual images. As a result, fewer frames can be used to image an extensive sample. This can help result in a reduced scan time and in a reduction in the effort used to assemble the images into a mosaic image.

However, it is to be considered that, when enlarging the field-of-view size, the objective has a relatively high resolution for all relevant wavelength ranges across the entire field of view. This desire for a high resolution with a simultaneously large field of view can correspond to an increase in, such as a maximization of, the etendue. The etendue is proportional to the square of the linear dimension, such as of the diameter, of the field of view. It is also proportional to the square of the numerical aperture (NA).

At the same time, it may be desirable, for example for routine applications, to reduce the complexity of the microscope objective. For example, this can lead to cost savings. A reduced complexity is understood to mean a reduction in the number of used optical elements, such as lenses. For example, the number of aspheric lenses can be reduced. It has been shown that this has resulted in a significant cost saving.

Finally, for many applications, it may be desirable for objectives with different properties, such as with different magnifications, to be interchangeably used. This can help make it possible, for example, to first record an overview image with a relatively lower resolution. The overview image can be used to record regions of interest (ROI). These can then be examined in detail with a high-resolution objective.

In order to simplify the interchange of objectives and to achieve compatibility with standard microscope stands, it can be desirable for the objective to be infinity-corrected. This means that it is designed for an infinity optical unit. In this case, the imaging light leaves the objective as a parallel beam. This allows the use of a tube of any length.

According to the disclosure, it was further recognized that the complexity of the objectives generally increases as the etendue increases. The objective can therefore have a number of lenses that depend on the etendue (G).

Objectives according to the disclosure can have a significantly reduced complexity, such as a lower number of lenses at a given etendue. Due to their high Strehl ratio, they may for example nevertheless ensure a high resolution over the entire field of view.

The objectives with a maximum of nine lenses can have an object field height, i.e. half an object field diameter, of more than 0.3 mm.

The objectives with a maximum of 15 lenses can have an object field height, i.e. half an object field diameter, of more than 0.6 mm.

The vignetting may be at most 5%, such as at most 3%.

In the case of an objective with 9 lenses, for example, they can be arranged in 6 subgroups. For example, these can be 3 single lenses and 3 cemented doublets.

In the case of an objective with a maximum of 15 lenses, they can be arranged in 8 or 9 subgroups. The subgroups can include 2 cemented triplets, 3 cemented doublets and 3 single lenses or 2 cemented triplets, 2 cemented doublets and 5 single lenses.

With such arrangements of the lenses, desirable optical properties could be achievable.

According to one aspect, the objective may be designed as a dry objective. It can have a numerical aperture (NA) in the range of 0.9-1.0. This can results in relatively high resolution.

According to an aspect, the objective may be designed as an immersion objective. It may have a numerical aperture (NA) of at least 1.0, such as at least 1.1. This can result in a relatively high resolution of the objective.

According to an aspect, the objective can be designed completely without aspheric lenses. This further can reduce the complexity of the objective. This can lead for example to a reduction in costs.

In the case of 9 lenses, they may be made of at least 5, such as at least 6, for example at least 7, for example at least 8 different types of glass.

In the case of an objective with a maximum of 15 lenses, they may be made of at least 8, such as at least 10, for example at least 12 different types of glass.

It has been shown that relatively good optical properties of the objective can be achieved by a suitable selection of different types of glass.

According to an aspect, the second lens group of the objective may have two cemented elements.

In an objective with an etendue of less than 1.8 $mm^2$, they may be a cemented doublet.

In an objective with an etendue of more than 1.8 $mm^2$, they may be cemented triplets.

According to an aspect, the objective can be apochromatically corrected over a bandwidth of at least 200 nm, such as in a wavelength range between 400 nm and 800 nm, for example in the range of 400 nm to 700 nm, for example in the range of 460 nm to 660 nm. It has been shown that by reducing the bandwidth over which the objective is apochromatically corrected, the number of lenses used could be reduced.

Apochromatically corrected means that the maximum deviation of the focus position within the spectrum in relation to the reference wavelength lies within the depth of field.

According to an aspect, the third lens group can have three subgroups (G31, G32 and G33). The first subgroup (G31) may have a positive refractive power here. The second subgroup (G32) may have a negative refractive power. The third subgroup (G33) may have a negative refractive power.

Here and below, the sequence of the optical elements of the objective are indicated in the direction from the object field to the field of view. In relation to the objective, "front" refers to the side facing the object field, and "rear" refers to the side facing away from the object field.

Further possible details of the objective are described below.

The objective can have a relatively short working distance. For example, the following may apply:

$$d\colon L < 4.9\times 10^{-3},$$

wherein d indicates the distance from the coverslip to the periphery of the frontmost lens surface of the objective, and L indicates the total distance between the object field and the vertex of the (in the direction of the beam) rearmost lens surface of the objective.

The working distance of the objective can also meet the following conditions:

$$d0\colon L < 9\times 10^{-3},$$

wherein d0 indicates the distance from the object field to the vertex of the frontmost lens surface of the objective.

If the maximum distance of light rays, emanating from an object on the optical axis, to the optical axis is defined in the three subgroups G31, G32 and G33 of the third lens group G3 as h1, h2 and h3, these parameters can for example meet the following inequalities:

$$1.1 < h1\colon h2 < 1.8 \text{ and/or}$$

$$1.2 < h2\colon h3 < 1.6.$$

For an objective with a maximum of 9 lenses, the third lens group G3 may have a first lens with a positive refractive power and a second lens with a negative refractive power.

Together with a tube lens unit, such as with a tube lens having a focal length of 200 mm or having a focal length of 164.5 mm, the microscope objective according to the preceding description can form an optical assembly.

The disclosure seeks to improve a microscope, such as for scanning applications, such as for optical mapping.

In an aspect, the disclosure provides a microscope with an objective according to the preceding description. Features are such a microscope are evident from the preceding description.

The microscope may comprise an automated scanning device. The scanning device can enable a one-dimensional (linear) displacement of the sample, a two-dimensional displacement of the sample, or a three-dimensional displacement of the sample. In addition to linear displacements, the scanning device can also have one, two or three rotational degrees of freedom. This makes it possible to arrange the samples very flexibly, for example to displace them.

The scanning device may comprise an image acquisition device, such as a digital image acquisition device, for example a digital camera.

The scanning device may comprise an image processing device. The latter may, for example, enable automated processing. For example, this simplifies stitching of frames into a mosaic image.

The microscope objectives described above can be desirable for use in scanning applications, such as for optical mapping. For example, they simplify automated scanning of large, such as large-area, samples.

The disclosure seeks to improve a method for the automated scanning of a sample.

In an aspect, the disclosure provides a method comprising:

providing a microscope according to the preceding description;

providing a sample to be examined;

acquiring at least two images of different sections of the sample, wherein the sections have an overlap region; and assembling the images into a mosaic image.

The method may be, for example, an optical mapping method.

Before the images are assembled, they can be analysed and/or processed using an image processing algorithm. This can simplify and/or improve the assembly of the images.

It is also possible to analyse and/or process the assembled mosaic image after the images have been assembled using an image processing algorithm. This can further improve the quality.

To record images of different sections of the sample, the latter can be displaced linearly, two-dimensionally or three-dimensionally. It can be displaced for example step-by-step.

For example, the displacement of the sample and the recording of successive images of different sections of the sample can be automated.

BRIEF DESCRIPTION OF THE DRAWINGS

Other details of the disclosure are evident from the description of exemplary embodiments with reference to the figures, in which.

DETAILED DESCRIPTION

Figure 1:
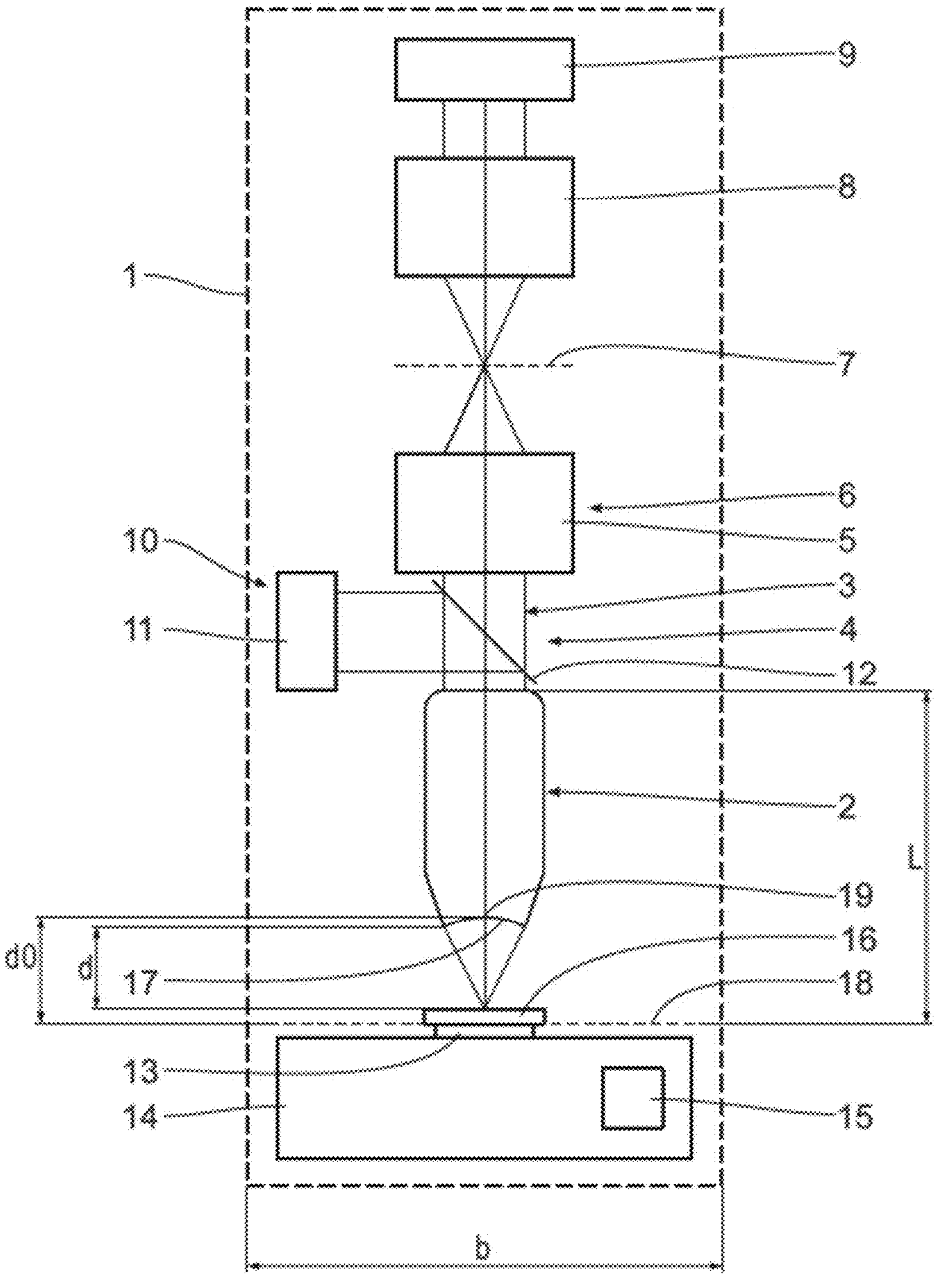
FIG. 1 schematically shows the setup of a microscope.

FIG. 1 schematically shows the basic setup of a microscope 1 by way of example. The illustration should be understood as an example and not as a limitation.

The microscope 1 comprises an infinity optical unit. This means that the beam path 3 downstream of the objective 2 runs parallel. The region between the objective 2 and a tube lens 5 of a tube lens unit 6 is also referred to as infinity space 4. Using the tube lens unit 6, an intermediate image is generated in an intermediate image plane 7. The intermediate image can be viewed using an eyepiece 8. It can also be guided to an image acquisition device, such as in the form of a camera 9. The camera 9 can be a digital camera.

FIG. 1 also shows an illumination device 10 as an example. The illumination device 10 has a radiation source unit 11. For example, a laser can serve as the radiation source unit 11.

The illumination device 10 may also have a beam splitter 12. Using the beam splitter 12, the illumination radiation 3 can be guided through the objective 2 to a sample 13 to be viewed. The beam path shown schematically in FIG. 1 is suitable for example for epi-fluorescence systems. The illumination can be in the form of Köhler illumination. Critical illumination is also possible. Instead of the beam splitter 12, a prism, such as a cubic prism, may also be provided. Alternative variants for coupling the illumination radiation are known from the prior art.

Also schematically illustrated in FIG. 1 is a scanning device 14. The scanning device 14 comprises one or more displacement devices 15. Using the displacement devices 15, the sample 13 can be displaced relative to the beam path 3, for example relative to the objective 2, in the microscope 1.

To illustrate the working distance of the objective 2, the distance d from the coverslip 16 to the outer periphery of the frontmost lens surface 17 of the objective 2 is shown in FIG. 1 as an example.

The distance from an object plane 18 to the vertex 19 of the frontmost lens surface 17 is shown as d0.

L denotes the total distance between the object plane 18 and the vertex 19 of the (in the beam direction) rearmost lens surface of the objective 2. The latter is not explicitly shown in FIG. 1.

The microscope 1 may have a footprint with a width b of not more than 250 mm, such as not more than 205 mm.

Figure 2:
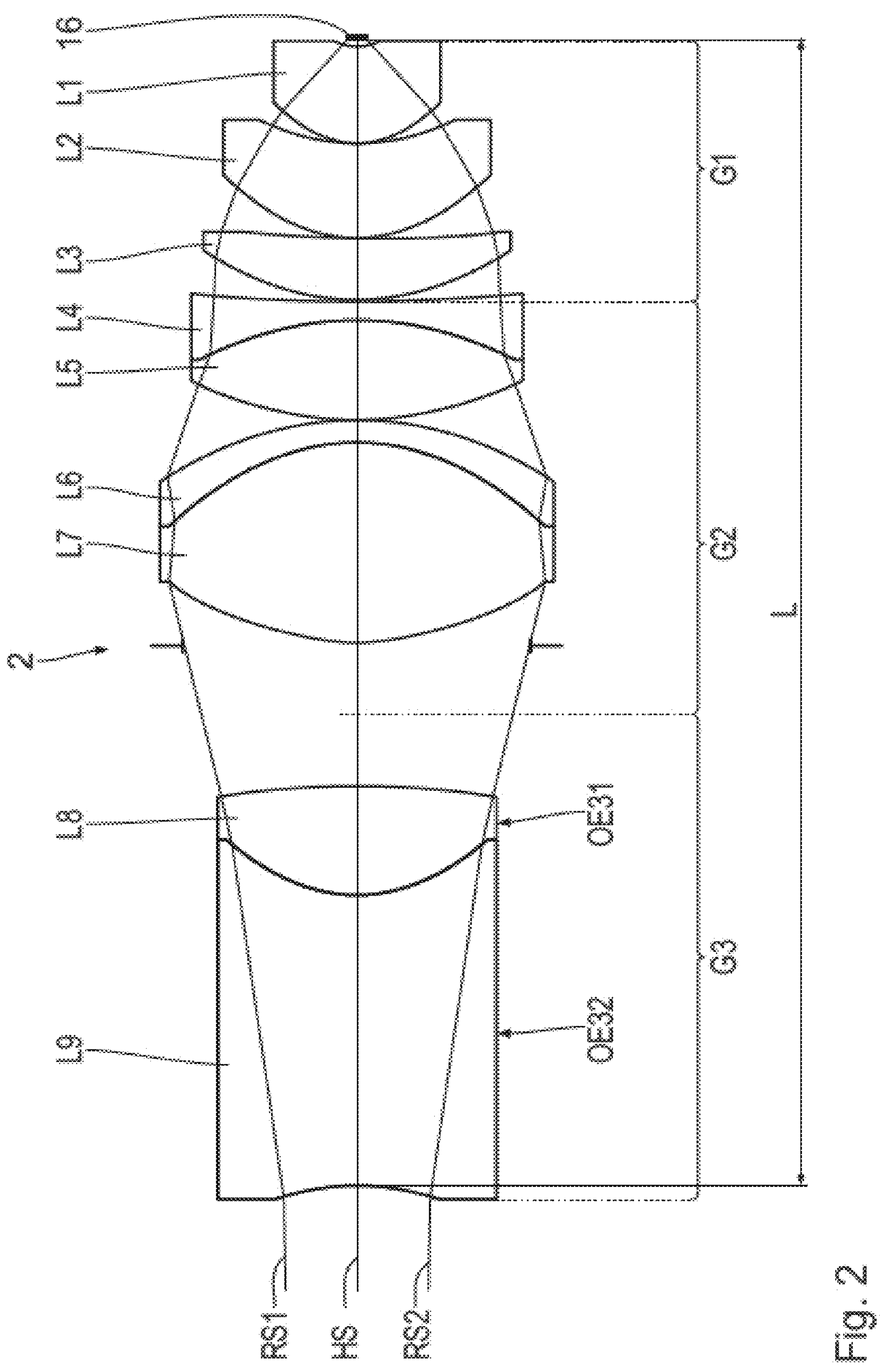
FIG. 2 shows a schematic longitudinal section through the optical components of the microscope objective according to a first variant.

FIG. 2 shows a longitudinal section through the arrangement of the optical components of the objective 2.

All variants (E1, E2 and E3) are suitable for use with coverslips 16 with a thickness of 0.17 mm, a refractive index nd=1.523 and the Abbe number vd=54.52 (based on a d-line of 587.562 nm).

Figure 3:
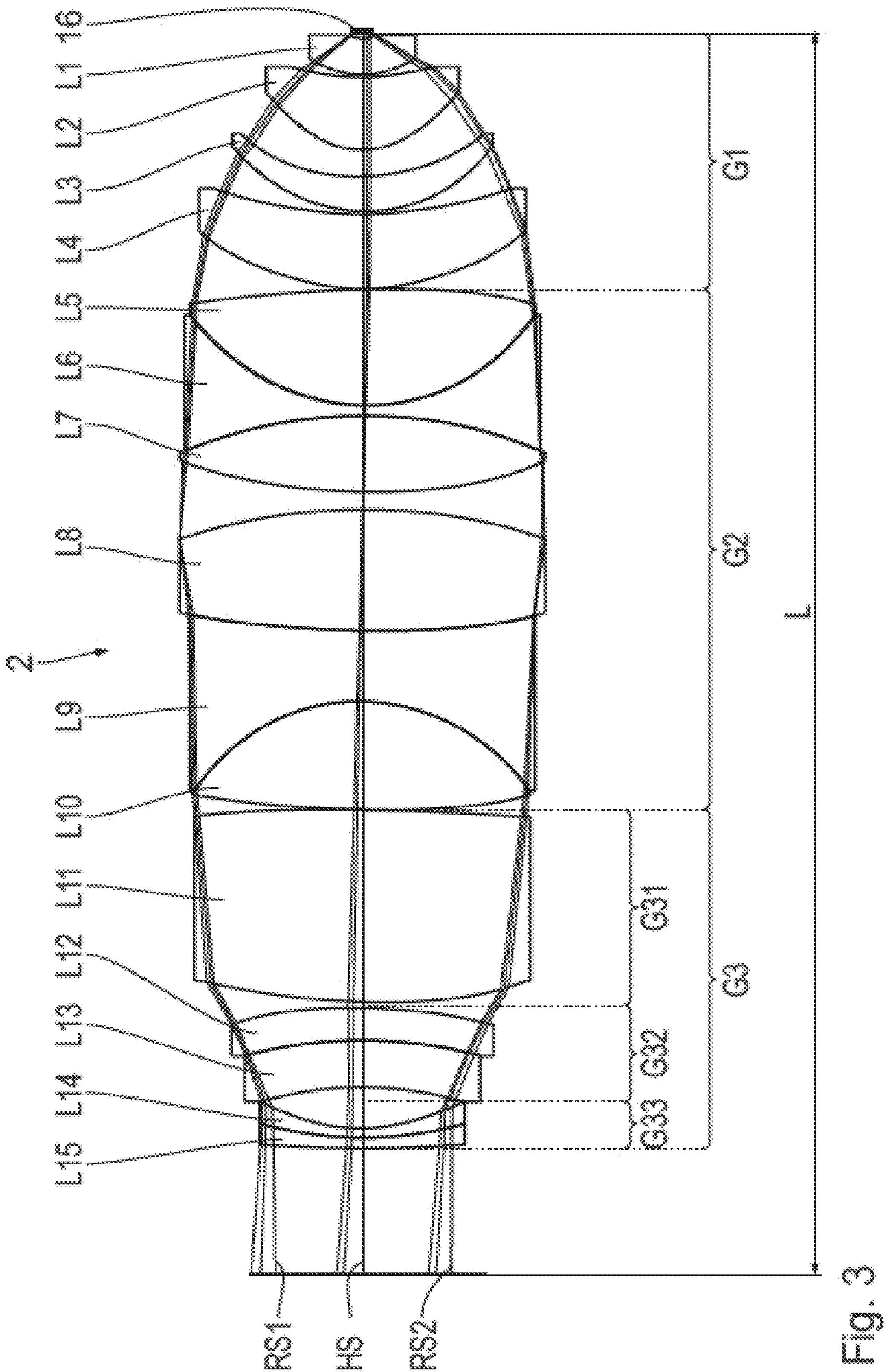
FIG. 3 shows a schematic longitudinal section through the optical components of the microscope objective according to a second variant.
Figure 4:
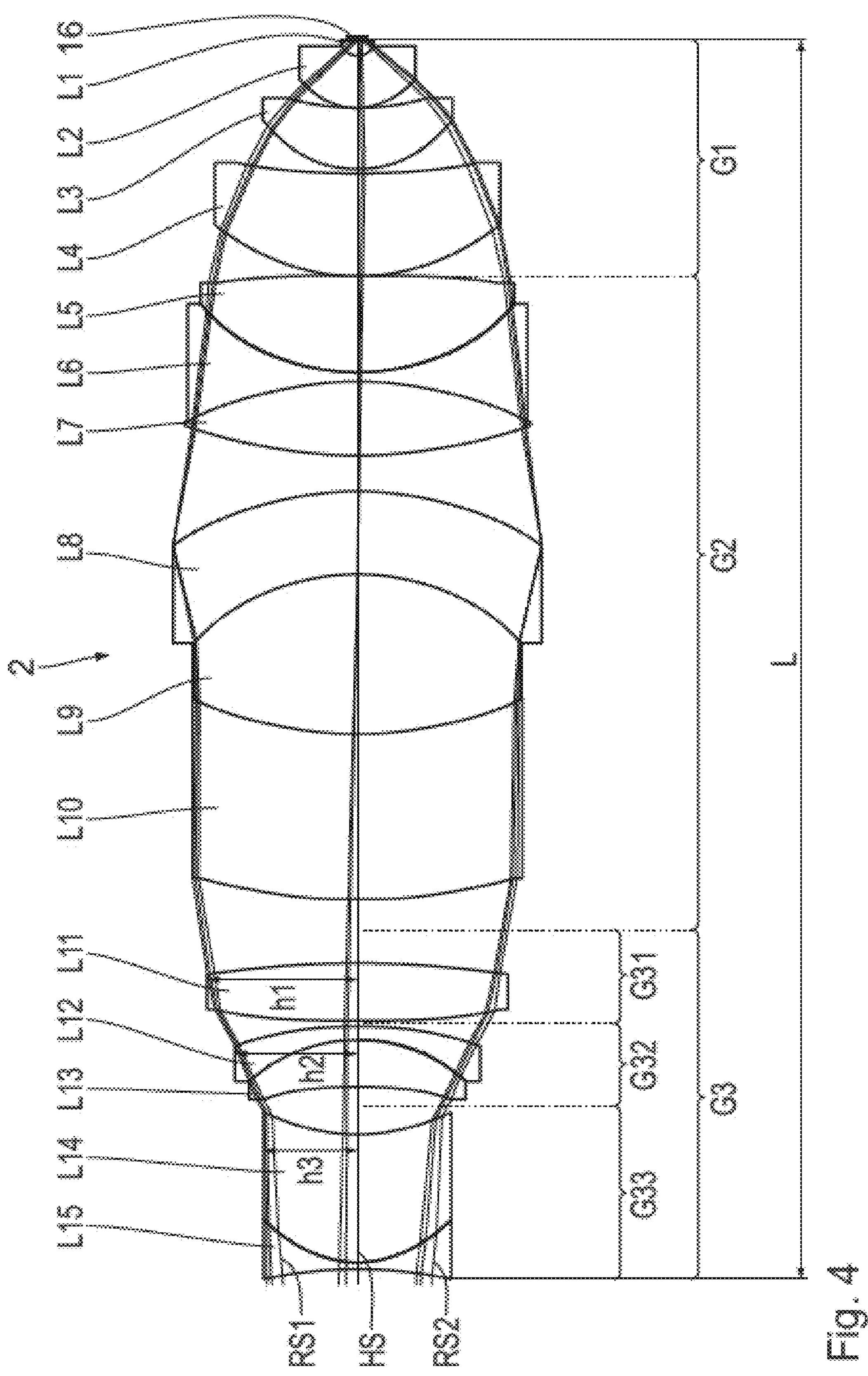
FIG. 4 shows a schematic longitudinal section through the optical components of the microscope objective according to a third variant.

FIGS. 2 to 4 illustrate by way of example the profile of a central chief ray HS and two marginal rays RS1, RS2.

For reasons of clarity, mechanical components of the objective 2 are not shown in the figures.

FIGS. 2, 3 and 4 also show the coverslip (DG) 16.

The objective 2 is an apochromatic objective 2.

The variant (E1) shown in FIG. 2 is a dry objective.

The objective 2 according to FIG. 2 has 9 lenses L1 to L9.

The optical design data of the objective 2 according to FIG. 2 are shown in Tab. 1.

TABLE 1

Optical design data of the objective 2 according to FIG. 2:

| Surface No. | r (mm) | d (mm) | nd | vd |
|---|---|---|---|---|
| 1 | −16.730 | 15.067 | 1.804 | 46.50 |
| 2 | 9.846 | 4.663 | 1.717 | 29.62 |
| 3 | −59.780 | 4.416 | | |
| 4 | Infinity | 0.154 | | |
| 5 | 13.962 | 9.317 | 1.439 | 94.95 |

TABLE 1-continued

Optical design data of the objective 2 according to FIG. 2:

| Surface No. | r (mm) | d (mm) | nd | vd |
|---|---|---|---|---|
| 6 | −13.757 | 2.902 | 1.691 | 54.71 |
| 7 | −22.985 | 1.525 | | |
| 8 | 18.606 | 5.402 | 1.569 | 71.34 |
| 9 | −13.522 | 1.000 | 2.003 | 28.27 |
| 10 | 45.162 | 0.673 | | |
| 11 | 15.918 | 3.165 | 1.569 | 71.34 |
| 12 | 66.860 | 0.354 | | |
| 13 | 9.509 | 4.089 | 1.592 | 68.37 |
| 14 | 12.624 | 0.130 | | |
| 15 | 5.477 | 6.684 | 1.883 | 40.76 |
| 16 | 4.311 | 0.288 | | |

The refractive index (nd) and the Abbe number (vd) refer to the d-line (587.562 nm). Additional data for the objective 2:

Magnification: 40 times
NA: 0.95
L: 60.00 mm
d: 0.150 mm
d0: 0.288 mm
$d:L=2.5\times10^{-3}$
$d0:L=4.8\times10^{-3}$
$h_{obj}$: 0.3125 mm
$G=0.8699\ mm^2$ The objective 2 is suitable for use with a tube lens 5 with a focal length of 200 mm.

The objective 2 has three lens groups G1, G2 and G3. The first lens group G1 has a positive refractive power. It comprises the lenses L1, L2 and L3.

The second lens group G2 has a positive refractive power. The second lens group G2 comprises the lenses L4, L5, L6 and L7.

The lenses LA and L5 form a cemented doublet.

The lenses L6 and L7 form a cemented doublet.

The third lens group G3 has a negative refractive power.

The third lens group G3 comprises the lenses L8 and L9.

The lenses L8 and L9 form a cemented doublet. The lens L8 is also referred to as the optical element OE31. It has a positive refractive power.

The lens L9 is also referred to as the optical element OE32. It has a negative refractive power.

The objective 2 shown in FIG. 2 has an etendue of $G=0.8699\ mm^2$.

FIG. 3 shows a second variant (E2) of an objective 2.

The objective 2 according to FIG. 3 has 15 lenses L1 to L15.

The first lens group G1 comprises the lenses L1 to LA.

The second lens group G2 comprises the lenses L5 to L10.

The lenses L5 to L7 form a cemented triplet.

The lenses L8 to L10 form a cemented triplet.

The third lens group G3 comprises the lenses L11 to L15.

The lens L11 forms the subgroup G31.

The lenses L12 and L13 of the subgroup G32 form a cemented doublet.

The lenses L14 and L15 of the subgroup G33 form a cemented doublet.

The objective 2 according to FIG. 3 has an etendue $G=3.4799\ mm^2$.

The objective 2 according to FIG. 3 is a dry objective.

The optical design data of the objective 2 according to FIG. 2 are shown in Tab. 2.

TABLE 2

Optical design data of the objective 2 according to FIG. 3:

| Surface No. | r (mm) | d (mm) | nd | vd |
|---|---|---|---|---|
| 1 | 142.661 | 1.000 | 1.855 | 24.80 |
| 2 | 28.105 | 1.000 | 1.883 | 40.76 |
| 3 | 17.981 | 3.915 | | |
| 4 | −26.827 | 4.524 | 1.847 | 23.78 |
| 5 | −38.436 | 3.193 | 1.883 | 40.76 |
| 6 | −40.831 | 0.622 | | |
| 7 | 48.267 | 18.410 | 1.855 | 24.80 |
| 8 | −169.890 | 0.100 | | |
| 9 | 85.109 | 10.276 | 1.592 | 68.37 |
| 10 | −17.345 | 7.048 | 1.651 | 55.89 |
| 11 | 98.636 | 11.441 | 1.456 | 90.90 |
| 12 | −52.386 | 1.652 | | |
| 13 | 41.646 | 7.455 | 1.439 | 94.95 |
| 14 | −35.234 | 1.000 | 1.638 | 42.41 |
| 15 | 17.276 | 11.139 | 1.592 | 68.37 |
| 16 | −80.941 | 0.226 | | |
| 17 | 22.295 | 7.149 | 1.618 | 63.39 |
| 18 | 36.105 | 0.154 | | |
| 19 | 13.395 | 3.409 | 1.497 | 81.55 |
| 20 | 16.175 | 2.613 | | |
| 21 | 9.008 | 7.079 | 1.456 | 90.90 |
| 22 | 22.142 | 0.205 | | |
| 23 | 7.450 | 3.319 | 1.816 | 46.62 |
| 24 | 5.590 | 0.894 | | |

The refractive index (nd) and the Abbe number (vd) refer to the d-line (587.562 nm). Further data of the objective 2 according to FIG. 3:

Magnification: 20 times
NA: 0.95
L: 107.99 mm
d: 0.411 mm
d0: 0.894 mm
$d:L=3.8\times10^{-3}$
$d0:L=8.3\times10^{-3}$
$h_{obj}$: 0.625 mm
$G=3.4799\ mm^2$ The objective 2 is suitable for use with a tube lens 5 with a focal length of 164.5 mm.

If the maximum distance of light rays, emanating from an object on the optical axis, to the optical axis is defined in the three subgroups G31, G32 and G33 of the third lens group G3 as h1, h2 and h3, then:

h1=14.36 mm.
h2=11.00 mm.
h3=7.71 mm and so h1:h2=1.305 and
h2:h3=1.427.

FIG. 4 shows a further variant (E3) of the objective 2.

The objective 2 according to FIG. 4 is a water immersion objective.

The optical design data of the objective 2 according to FIG. 4 are shown in Table 3.

TABLE 3

Optical design data of the objective 2 according to FIG. 4:

| Surface No. | r (mm) | d (mm) | nd | vd |
|---|---|---|---|---|
| 1 | −44.873 | 1.000 | 1.581 | 40.75 |
| 2 | 14.040 | 25.000 | 1.613 | 44.49 |
| 3 | 22.604 | 6.243 | | |
| 4 | −42.712 | 6.106 | 1.589 | 61.27 |

TABLE 3-continued

| Optical design data of the objective 2 according to FIG. 4: | | | | |
|---|---|---|---|---|
| Surface No. | r (mm) | d (mm) | nd | vd |
| 5 | −18.702 | 1.669 | 1.673 | 38.26 |
| 6 | −42.806 | 0.631 | | |
| 7 | 88.252 | 8.081 | 1.847 | 23.78 |
| 8 | −142.575 | 10.312 | | |
| 9 | 77.638 | 25.000 | 1.637 | 42.41 |
| 10 | 45.052 | 17.776 | 1.439 | 94.95 |
| 11 | −26.083 | 10.845 | 1.713 | 53.83 |
| 12 | −37.642 | 4.540 | | |
| 13 | 60.618 | 8.938 | 1.439 | 94.95 |
| 14 | −46.368 | 2.138 | 1.637 | 42.41 |
| 15 | 24.348 | 9.896 | 1.592 | 68.37 |
| 16 | −205.611 | 0.544 | | |
| 17 | 25.823 | 13.153 | 1.487 | 84.47 |
| 18 | 73.714 | 0.664 | | |
| 19 | 13.538 | 7.990 | 1.456 | 90.90 |
| 20 | 25.889 | 0.100 | | |
| 21 | 8.331 | 6.725 | 1.883 | 40.76 |
| 22 | 2.084 | 1.957 | 1.459 | 67.82 |
| 23 | Infinity | 0.302 | 1.333 | 55.80 |

The refractive index (nd) and the Abbe number (vd) refer to the d-line (587.562 nm). Further data of the objective 2 according to FIG. 4:

Magnification: 20 times

NA: 1.0 (water immersion)

L: 169.78 mm d: 0.302 mm d0: 0.302 mm $d{:}L=1.8\times10^{-3}$ $d0{:}L=1.8\times10^{-3}$ hobj: 0.625 mm $G=4.6649\ mm^2$ The objective 2 is suitable for use with a tube lens 5 with a focal length of 164.5 mm.

The objective 2 (E3) according to FIG. 4 has an etendue $G=4.6649\ mm^2$.

If the maximum distance of light rays, emanating from an object on the optical axis, to the optical axis is defined in the three subgroups G31, G32 and G33 of the third lens group G3 as h1, h2 and h3, then:

h1=16.55 mm, h2=13.78 mm, h3=9.79 mm and so h1:h2=1.301 and h2:h3=1.408.

Figure 5:
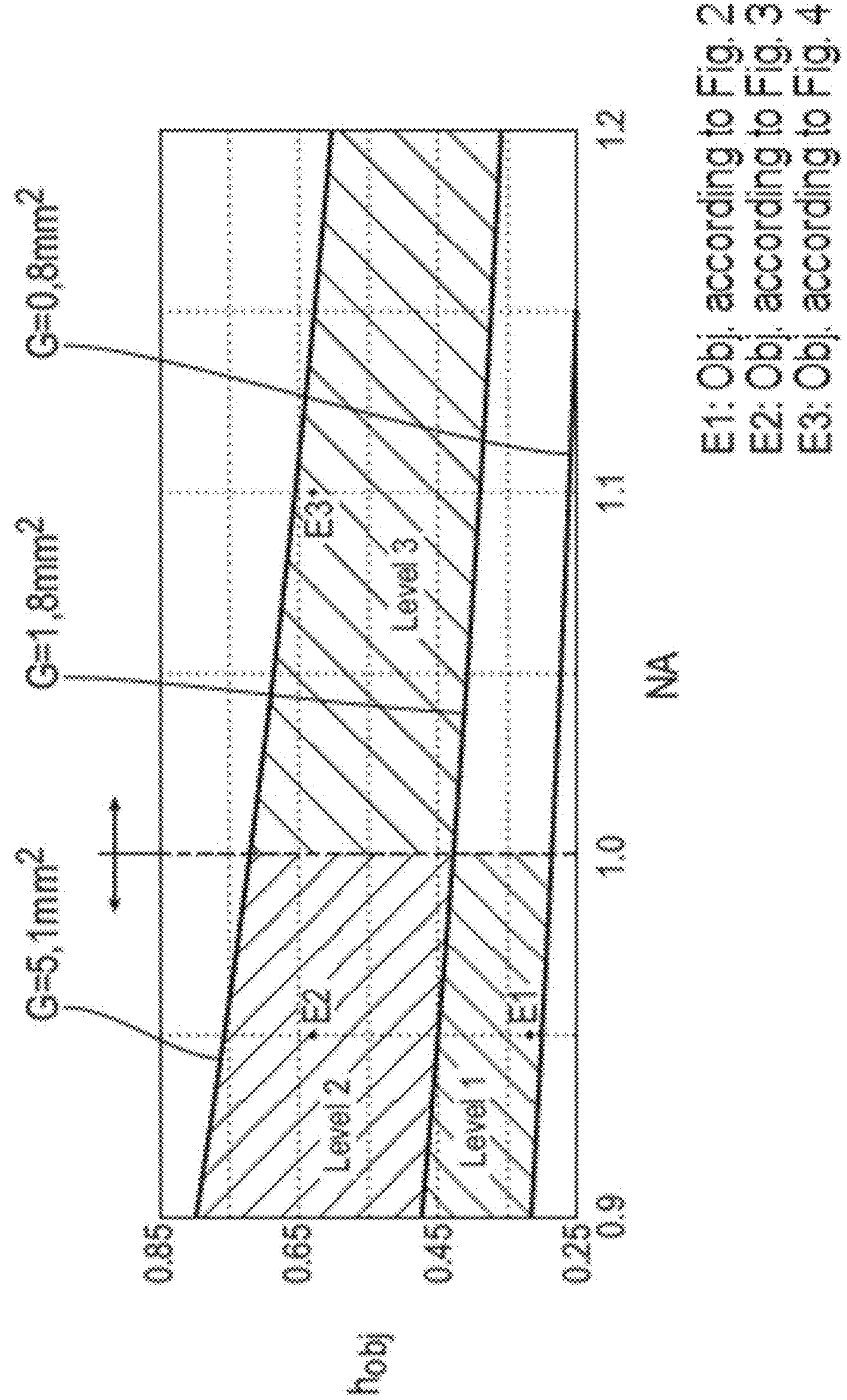
FIG. 5 shows a comparison of the object field height ($h_{obj}$) and the numerical aperture of the three objectives according to variants.

FIG. 5 schematically shows the field-of-view heights (hobj), i.e. half the field-of-view diameter, in relation to the numerical aperture (NA) of the objectives (E1, E2, and E3). In addition, FIG. 5 shows the curves for an etendue $G=0.8\ mm^2$, $G=1.8\ mm^2$ and $G=5.1\ mm^2$. Objectives 2 with a numerical aperture of at least 1 form immersion objectives. Objectives with a numerical aperture NA<1 may be designed as dry objectives. Accordingly, the figure distinguishes between three different regions of the etendue. These are referred to as "Level 1", "Level 2" and "Level 3" as examples.

Figure 6:
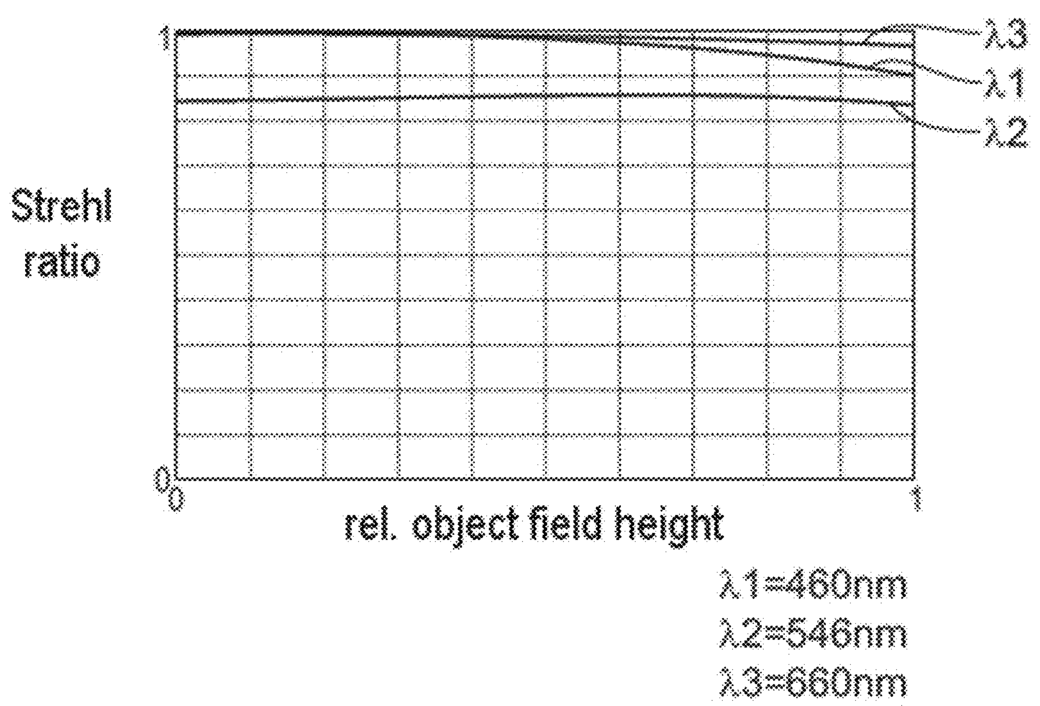
FIGS. 6-8 schematically show the profile of the Strehl ratio over the field of view under light of different wavelengths.
Figure 7:
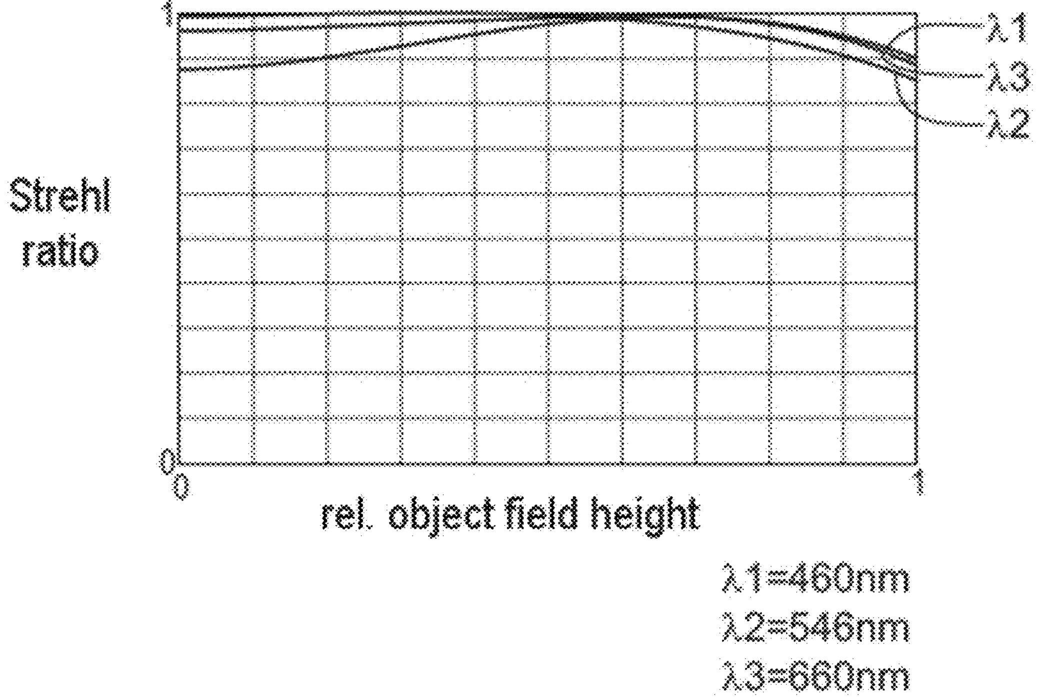
Figures 8, 9:
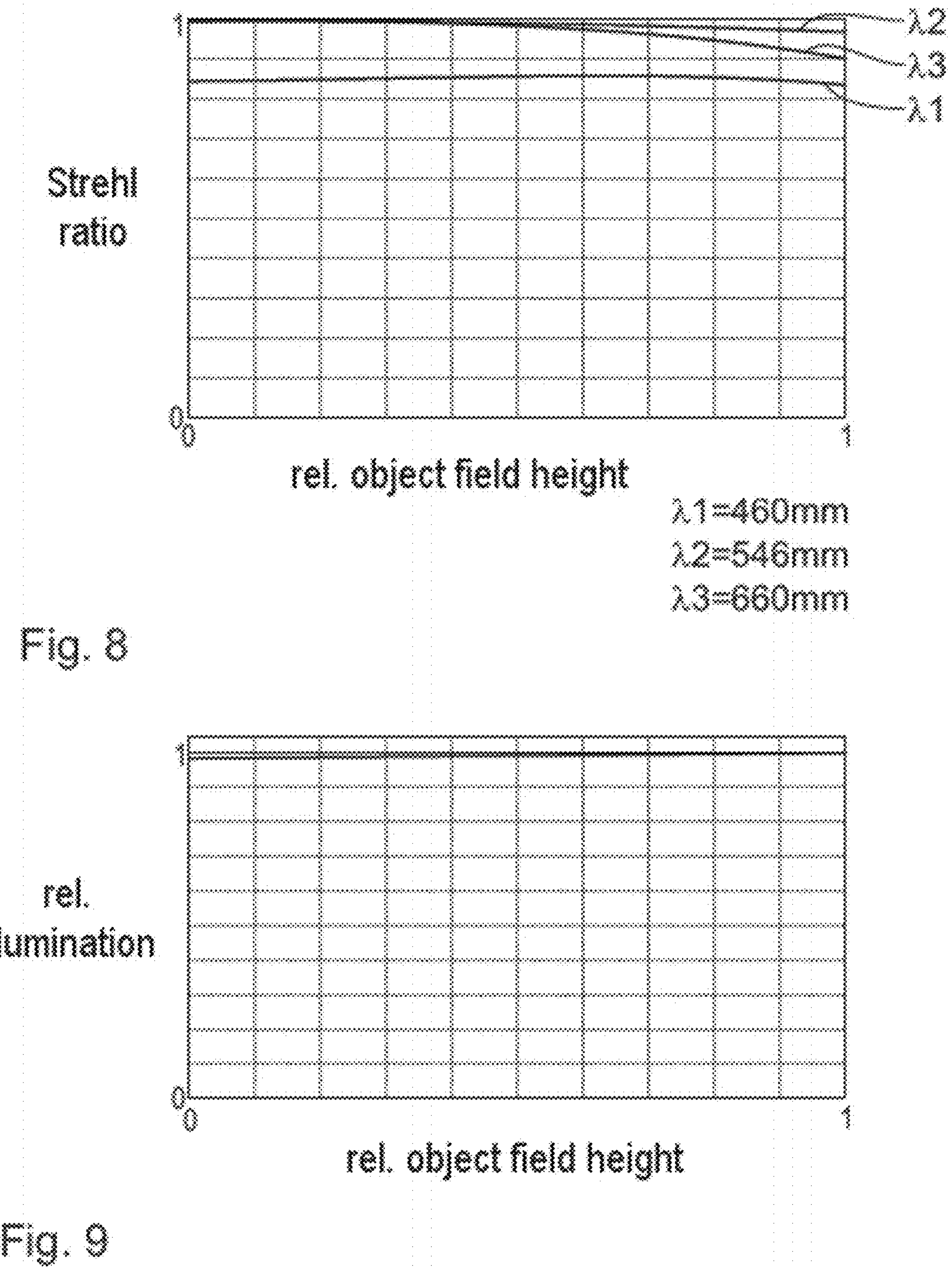
FIGS. 9-11 schematically show the profile of an intensity of the incident-light illumination over the field of view of the three objectives according to variants.

FIGS. 6-8 show the Strehl ratios of the three objectives 2 according to FIGS. 2, 3 and 4 for light with a wavelength λ1=460 nm, λ2=546 nm and λ3=660 nm, respectively.

As can be seen from the figures, the Strehl ratio over the entire field of view is greater than 0.8. For individual wavelengths or a limited wavelength range, the Strehl ratio over the entire field of view is even greater, such as greater than 0.83, for example greater than 0.9.

Figure 10:
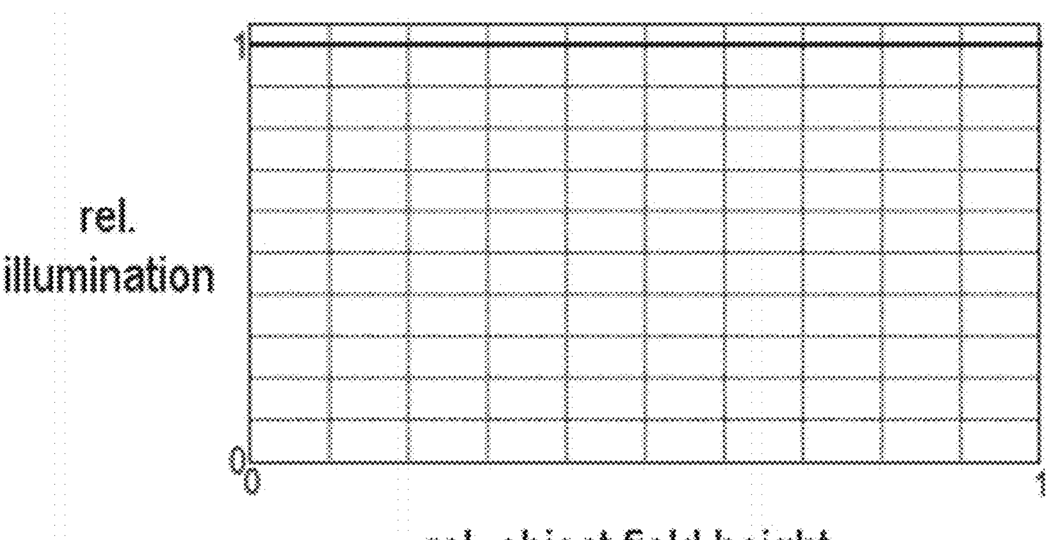
Figure 11:
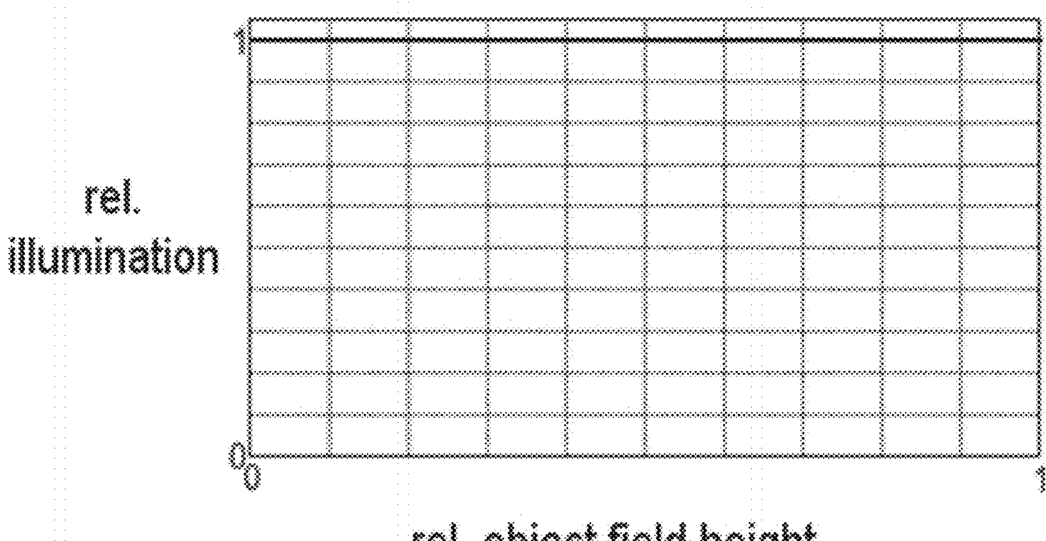

In FIGS. 9-11, the relative illumination intensity at a wavelength of 546.074 nm over the field of view is shown for the purpose of illustrating the peripheral light drop.

As can be seen from the figures, the objectives 2 lead, under incident-light illumination, to a homogeneous lighting of the field of view with minor vignetting.

What is claimed is:

1. A microscope objective, comprising:

a first lens group with a positive refractive power;

a second lens group with a positive refractive power; and a third lens group with a negative refractive power, wherein the microscope objective:

has a numerical aperture of at least 0.9;

has less than 5% vignetting;

is apochromatically corrected over a spectral bandwidth of at least 200 nanometers (nm);

i) has an etendue in the range of 0.8 square millimeters ($mm^2$) to 1.8 $mm^2$, and the microscope objective comprises at most nine lenses; or ii) has an etendue in of from 1.8 $mm^2$, and the microscope objective comprises at most 15 lenses; and is an infinity-corrected microscope objective configured to be used in scanning applications.

2. The microscope objective of claim 1, wherein the microscope objective is a dry objective having a numerical aperture of from 0.9 to 1.0.

3. The microscope objective of claim 1, wherein the microscope objective is an immersion objective having a numerical aperture of at least 1.0.

4. The microscope objective of claim 1, wherein the microscope objective has a Strehl ratio of at least 0.8 over at least 70% of a field of view of the microscope objective.

5. The microscope objective of claim 1, wherein the microscope objective does not have aspheric lenses.

6. The microscope objective of claim 1, wherein the second lens group comprises two cemented elements.

7. The microscope objective of claim 1, wherein the microscope objective is apochromatically corrected over a bandwidth of at least 200 nm in a wavelength of between 400 nm and 800 nm.

8. The microscope objective of claim 1, wherein:

the third lens group comprises first, second and third subgroups;

the first subgroup has a positive refractive power;

the second subgroup has a negative refractive power; and the third subgroup has a negative refractive power.

9. The microscope objective of claim 1, wherein the microscope objective has the following optical design data:

| Surface No. | r (mm) | d (mm) | nd | vd |
|---|---|---|---|---|
| 1 | −16.730 | 15.067 | 1.804 | 46.50 |
| 2 | 9.846 | 4.663 | 1.717 | 29.62 |
| 3 | −59.780 | 4.416 | | |
| 4 | Infinity | 0.154 | | |
| 5 | 13.962 | 9.317 | 1.439 | 94.95 |
| 6 | −13.757 | 2.902 | 1.691 | 54.71 |
| 7 | −22.985 | 1.525 | | |
| 8 | 18.606 | 5.402 | 1.569 | 71.34 |
| 9 | −13.522 | 1.000 | 2.003 | 28.27 |
| 10 | 45.162 | 0.673 | | |
| 11 | 15.918 | 3.165 | 1.569 | 71.34 |
| 12 | 66.860 | 0.354 | | |
| 13 | 9.509 | 4.089 | 1.592 | 68.37 |
| 14 | 12.624 | 0.130 | | |

-continued

| Surface No. | r (mm) | d (mm) | nd | vd |
|---|---|---|---|---|
| 15 | 5.477 | 6.684 | 1.883 | 40.76 |
| 16 | 4.311 | 0.288. | | |

10. The microscope objective of claim 1, wherein the microscope objective has the following optical design data:

| Surface No. | r (mm) | d (mm) | nd | vd |
|---|---|---|---|---|
| 1 | 142.661 | 1.000 | 1.855 | 24.80 |
| 2 | 28.105 | 1.000 | 1.883 | 40.76 |
| 3 | 17.981 | 3.915 | | |
| 4 | −26.827 | 4.524 | 1.847 | 23.78 |
| 5 | −38.436 | 3.193 | 1.883 | 40.76 |
| 6 | −40.831 | 0.622 | | |
| 7 | 48.267 | 18.410 | 1.855 | 24.80 |
| 8 | −169.890 | 0.100 | | |
| 9 | 85.109 | 10.276 | 1.592 | 68.37 |
| 10 | −17.345 | 7.048 | 1.651 | 55.89 |
| 11 | 98.636 | 11.441 | 1.456 | 90.90 |
| 12 | −52.386 | 1.652 | | |
| 13 | 41.646 | 7.455 | 1.439 | 94.95 |
| 14 | −35.234 | 1.000 | 1.638 | 42.41 |
| 15 | 17.276 | 11.139 | 1.592 | 68.37 |
| 16 | −80.941 | 0.226 | | |
| 17 | 22.295 | 7.149 | 1.618 | 63.39 |
| 18 | 36.105 | 0.154 | | |
| 19 | 13.395 | 3.409 | 1.497 | 81.55 |
| 20 | 16.175 | 2.613 | | |
| 21 | 9.008 | 7.079 | 1.456 | 90.90 |
| 22 | 22.142 | 0.205 | | |
| 23 | 7.450 | 3.319 | 1.816 | 46.62 |
| 24 | 5.590 | 0.894. | | |

11. The microscope objective of claim 1, wherein the microscope objective has the following optical design data:

| Surface No. | r (mm) | d (mm) | nd | vd |
|---|---|---|---|---|
| 1 | −44.873 | 1.000 | 1.581 | 40.75 |
| 2 | 14.040 | 25.000 | 1.613 | 44.49 |
| 3 | 22.604 | 6.243 | | |
| 4 | −42.712 | 6.106 | 1.589 | 61.27 |
| 5 | −18.702 | 1.669 | 1.673 | 38.26 |
| 6 | −42.806 | 0.631 | | |
| 7 | 88.252 | 8.081 | 1.847 | 23.78 |
| 8 | −142.575 | 10.312 | | |
| 9 | 77.638 | 25.000 | 1.637 | 42.41 |
| 10 | 45.052 | 17.776 | 1.439 | 94.95 |
| 11 | −26.083 | 10.845 | 1.713 | 53.83 |
| 12 | −37.642 | 4.540 | | |
| 13 | 60.618 | 8.938 | 1.439 | 94.95 |
| 14 | −46.368 | 2.138 | 1.637 | 42.41 |
| 15 | 24.348 | 9.896 | 1.592 | 68.37 |
| 16 | −205.611 | 0.544 | | |
| 17 | 25.823 | 13.153 | 1.487 | 84.47 |
| 18 | 73.714 | 0.664 | | |
| 19 | 13.538 | 7.990 | 1.456 | 90.90 |
| 20 | 25.889 | 0.100 | | |
| 21 | 8.331 | 6.725 | 1.883 | 40.76 |
| 22 | 2.084 | 1.957 | 1.459 | 67.82 |
| 23 | Infinity | 0.302 | 1.333 | 55.80. |

12. The microscope objective of claim 1, wherein the microscope objective has at most nine lenses.

13. The microscope objective of claim 1, wherein the microscope objective has at most 15 lenses.

14. The microscope objective of claim 1, wherein the microscope objective has an etendue of from 0.8 square $mm^2$ to 1.8 $mm^2$, and the microscope objective comprises at most nine lenses.

15. The microscope objective of claim 1, wherein the microscope objective has an etendue of more than 1.8 $mm^2$, and the microscope objective comprises at most 15 lenses.

16. An optical assembly, comprising:

a microscope objective according to claim 1; and a tube lens unit comprising a tube lens having a focal length of 200 mm or 164.5 mm.

17. The optical assembly of claim 16, wherein the microscope objective does not have aspheric lenses.

18. A microscope, comprising:

a microscope objective according to claim 1.

19. The microscope of claim 18, wherein the microscope is an automated scanning device.

20. A method, comprising:

using a microscope to acquire at least two images of different sections of a sample, the sections comprising an overlap region; and assembling the images into a mosaic image, wherein the microscope comprises a microscope objective according to claim 1.

* * * * *